United States Patent [19]

Terada

[11] Patent Number: 5,099,665
[45] Date of Patent: * Mar. 31, 1992

[54] KEY HAVING A GRIPPING PORTION MADE OF SYNTHETIC RESIN

[76] Inventor: Masaji Terada, 15-15-202, Hiagari 2-chome, Kokurakita-ku, Kitakyushu-shi, Fukuoka 803, Japan

[*] Notice: The portion of the term of this patent subsequent to Jan. 22, 2008 has been disclaimed.

[21] Appl. No.: 553,028

[22] Filed: Jul. 3, 1990

[30] Foreign Application Priority Data

| Dec. 30, 1989 | [JP] | Japan | 1-344086 |
| Apr. 6, 1990 | [JP] | Japan | 2-37568[U] |
| Apr. 12, 1990 | [JP] | Japan | 2-39817[U] |
| May 19, 1990 | [JP] | Japan | 2-52415[U] |

[51] Int. Cl.$^5$ .............................. G05B 19/00
[52] U.S. Cl. .............................. 70/408; 70/395
[58] Field of Search .............. 70/395, 408, 460

[56] References Cited

U.S. PATENT DOCUMENTS

| 2,672,747 | 3/1954 | Craig | 70/408 |
| 3,427,833 | 2/1969 | Lempke | 70/408 |
| 3,526,112 | 9/1970 | Herrington . | |
| 3,895,508 | 7/1975 | Crasnianski | 70/408 |
| 4,235,087 | 11/1980 | Bianchi | 70/408 |
| 4,472,954 | 9/1984 | Kichise | 70/408 |
| 4,986,100 | 1/1991 | Terada | 70/395 |

FOREIGN PATENT DOCUMENTS

| 2408468 | 3/1975 | Fed. Rep. of Germany | 70/395 |
| 2149008 | 3/1973 | France | 70/408 |
| 47-32695 | 12/1972 | Japan . | |
| 466785 | 8/1977 | Japan . | |
| 2045852 | 11/1980 | United Kingdom | 70/408 |
| 2155988A | 10/1985 | United Kingdom . | |
| 9005821 | 5/1990 | World Int. Prop. O. | 70/456 R |

*Primary Examiner*—Renee S. Luebke
*Assistant Examiner*—Darnell M. Boucher
*Attorney, Agent, or Firm*—Armstrong & Kubovcik

[57] ABSTRACT

A key having a gripping portion made of synthetic resin and a metal made base end portion is provided with an insertion portion covered with a synthetic resin. The insertion portion is made thin, and the gripping portion made of synthetic resin covers the corresponding insertion portion. A reinforcement portion having a thickness which is the same as that of the blade portion, but having a width which is wider than the width of the blade portion is provided at a middle portion between the insertion portion and the blade portion on which key serrations are formed. The key is not bulky in size and can not be damaged even after repeated uses.

5 Claims, 4 Drawing Sheets

KEY HAVING A GRIPPING PORTION MADE OF SYNTHETIC RESIN

BACKGROUND OF THE INVENTION

This invention relates a key having a gripping portion made of synthetic resin.

Keys having a gripping portion made of synthetic resin have been frequently utilized since any color of synthetic resin can be used, and the synthetic resin therefor has good electrical insulation properties.

A conventional key having a gripping portion made of synthetic resin consists of a key body having a blade portion wherein key serrations are formed at the side thereof, and a gripping portion is attached and fixed at the insertion portion of the corresponding key body. The thickness of the gripping portion is two to four times the thickness of the blade portion, because it is necessary to mold the insertion portion of the key body so as to cover the insertion portion thereof with a fixed thickness when the gripping portion is composed of synthetic resin.

Therefore, in the event that a plurality of keys according to the conventional examples are attached to a key ring or the like, a problem occurs in that they become bulky in volume.

Hence, the applicant has proposed a key having a gripping portion made of synthetic resin, which consists of a key body furnished with a blade portion on which key serrations are formed, as shown in the U.S. patent application Ser. No. 442,816, and an insertion portion is integrally connected to the corresponding blade portion, having a thickness which is thinner than the corresponding blade portion. The corresponding gripping portion is inserted and fixed in the corresponding insertion portion, having a thickness in the range of 0.9 through 1.3 times that of the blade portion.

However, since the insertion portion of the key body is made thinner than the thickness of the blade portion of the corresponding key body, if a large torque is applied to the insertion portion, or if the gripping portion is bent with the blade portion inserted in the key slot, there may occur a problem wherein the junction portion between the insertion portion and the blade portion, where a stage is formed, is damaged.

The present invention has been proposed, taking these problems into consideration. It is therefore an object of the invention to provide a key having a thin gripping portion made of synthetic resin, which is not bulky in use and in which the strength of the key has been further increased.

SUMMARY OF THE INVENTION

A key having a gripping portion made of synthetic resin according to the above object of the invention is so composed that, in a key having a gripping portion made of synthetic resin, which consists of a metal-made key body furnished with a blade portion on which key serrations are formed and having an insertion portion integrally connected and attached to the corresponding blade portion and a synthetic resin gripping portion to cover the corresponding insertion portion, the thickness of the insertion portion can be made thinner than the thickness of the blade portion. The thickness of the gripping portion is in the range from 0.9 to 1.3 times the thickness of the blade portion, and a reinforcement portion which is sufficiently wider than the width of the blade portion and having a thickness which is roughly equivalent to the thickness of the blade portion is provided between the insertion portion and the blade portion, thereby causing a wide insertion portion to be joined together.

In a key having a gripping portion made of synthetic resin according to the invention, the insertion portion of the metal-made key body is made thinner than the thickness of the blade portion, and the outer circumference of the insertion portion is covered with a synthetic resin material. Further, the thickness of the gripping portion is in the range from 0.9 to 1.3 times the thickness of the blade portion. Therefore, when manufacturing a key having the gripping portion made of synthetic resin, it is possible to manufacture the key by inserting the insertion portion of the metal-made key body, which is produced in advance, into the center of a metal die and pouring synthetic resin in the insertion portion. Therefore, it is possible to manufacture a key having a gripping portion made of synthetic resin, which is comparatively cheap in cost and which is not bulky in size.

Further, since the metal made key body is composed by providing a wide reinforcement portion between the insertion portion and the blade portion, the distance of the connection between the insertion portion and the reinforcement portion can be lengthened. It is thereby possible to provide a key having a gripping portion made of synthetic resin, which is durable against bending and twisting.

Also, in the invention, the maximum thickness of the gripping portion is made 1.0 to 1.3 times the thickness of the blade portion, and the middle portion of the gripping portion can be swelled a little. By so composing the key as described above, when the key having a gripping portion made of synthetic resin is placed on a plane surface (for instance, on a desk), it is possible to easily pick up the key having a gripping portion made of synthetic resin, since one end of the gripping portion can advantageously be lifted up by pushing the other end thereof.

And it is also possible to expose metal-made insertion portion to the inner surface of a hole for mounting a key ring formed at the gripping portion. In the injection molding step for producing a key having the corresponding gripping portion made of synthetic resin, the insertion portion which is made thin can be held by pushing the exposed portion with a metal die, and the insertion portion is not pushed with synthetic resin which is poured. As a result the finished key has in the periphery thereof a hole for mounting a key ring which is reinforced with metal, and thus the hole is not subjected to damage by a key ring, etc. to be mounted therein.

Furthermore, it is preferable that a reinforcement fillet is formed at the junction portion between the wide reinforcement portion and the insertion portion integrally connected to the corresponding reinforcement portion, wherein the insertion portion is made thinner than the corresponding reinforcement portion. The reinforcement fillet thereby reduces the stress concentration, which may be produced at the junction portion between the reinforcement portion and the insertion portion. The strength of a key having a gripping portion made of a synthetic resin is thereby increased.

DETAILED DESCRIPTION OF THE PREFERRED EMBODIMENTS

With reference given to the drawings attached herewith, the embodiments of the present invention will be subsequently explained for a more complete understanding of the present invention.

Figure 1:
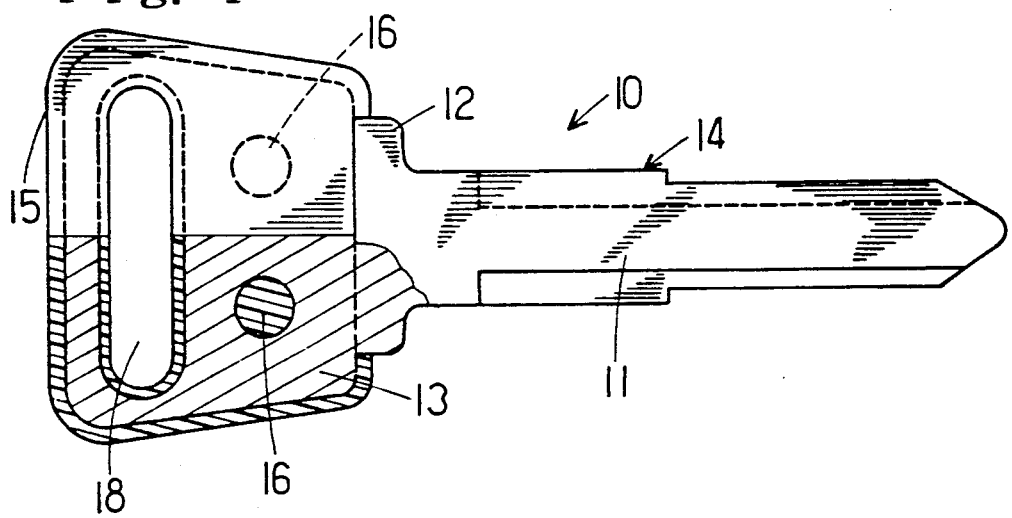
FIG. 1 is a partially notched plane view of a key having a gripping portion made of synthetic resin according to the first embodiment of the invention.
Figure 2:
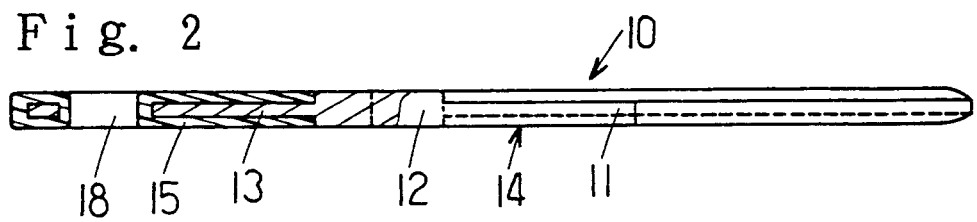
FIG. 2 is a partially notched side elevation view of the same key shown in FIG. 1.

As shown in FIG. 1 and FIG. 2, a key 10 having a gripping portion made of synthetic resin according to the first embodiment of the invention comprises a metal made key body 14 furnished with a blade portion 11 on which key serrations are formed in use. A wide reinforcement portion 12 is integrally connected to the corresponding blade portion 11 and an insertion portion 13 is integrally connected to the corresponding reinforcement portion 12, a gripping portion 15, made of synthetic resin, can cover the insertion portion 13 of the key body 14. The ensuing descriptions explain these components. In the ensuing descriptions, components which have the same reference numbers will be referred to in subsequent embodiments, respectively, thereby simplifying the explanation thereof.

The key body 14 can be made of a machinable metal such as brass, steel, copper, stainless steel, aluminum, white copper alloy, etc., and the outer surface thereof may be plated with silver gold plating, nickel plating, chrome plating, or various other suitable platings.

The thickness of the reinforcement portion 12 integrally connected to the corresponding blade portion 11 is similar to the thickness of the blade portion, however the width thereof is sufficiently wider than the width of the blade portion 11. The thickness of the insertion portion 13 to be connected to the corresponding reinforcement portion 12 is made thinner than the thickness of the blade portion, and is in the range from 0.4 through 0.8 times the thickness thereof. The corresponding insertion portion 13 is furnished with a small hole 16 (one or more than three holes may also be provided), thereby causing the synthetic resin, which composes the surface and the rear gripping portions, to be tightly connected with the insertion portion B. Further, a slot hole 18 may be provided, thereby enabling the key 10 having the gripping portion made of synthetic resin to be mounted to a key ring (not shown).

The thickness of the gripping portion 15 which covers the corresponding insertion portion 13 is roughly equivalent to the thickness of the blade portion 11, and the corresponding gripping portion 15 is so composed that it covers the insertion portion 13. The gripping portion 15 is formed by injection molding by pouring a liquefied synthetic resin into a metal die after the insertion portion 13 of the key body 14 has been fixed at an appointed position wherein the metal die. However, in certain occasions, for instance a, two-split type gripping portion which has been molded to an appointed shape is prepared in advance, and the insertion portion is inserted into the corresponding gripping portion. Then, the insertion portion and the gripping portion can be mounted and fixed together by an adhesive agent, an electromagnetic heating method, or an ultrasonic heating method.

In the above cases, the gripping portion 15 may be made of synthetic resins such as polyether imide resin, polycarbonate resin, polyether sulfone resin, polybutylene terephthalate resin, polyphenylene sulfide resin, polysulfone resin, polyethylene phthalate resin, polyacetal resin, polyamide resin, polypropyrene resin, methacrylic resin, metamorphic PPE resin, ABS resin, AS resin or synthetic rubber (a hard type synthetic rubber is preferable), or a complex material of the above synthetic resins with glass fiber, or by a complex material which is produced by mixing aluminum powder or stainless steel powder with either of the above synthetic resins, thereby causing the insertion portion 13 to be positioned therein.

Also, the thickness of the gripping portion 15 is roughly equivalent to the thickness of the blade portion 11 in this embodiment. However, in some cases, it is possible to change the thickness of the gripping portion 15 so as to be in the range from 0.9 to 1.3 times the thickness of the blade portion 11.

Therefore, in a key 10 having a gripping portion made of synthetic resin, the gripping portion 15 can be made of synthetic resin having a color tone which is different from the color tone of a metal made key body 14. Further, as the thickness of the gripping portion 15 is roughly equivalent to the thickness of the blade portion 11, there is an excellent feature in that the keys according to the invention do not become bulky even when a plurality of keys are attached to a key ring or key holder. Furthermore, when using keys according to the present invention, since torque is transmitted to the blade portion 11 from the gripping portion 15 through the reinforcement portion 12, the keys possess sufficient strength and durability so as to stand against repeated uses.

Consecutively, the ensuing description explains the second to the seventh embodiments of the invention. As the materials of the key body and the gripping portion are the same as those for the key body 14 and the gripping portion 15 according to the first embodiment, further explanation of these features shall be omitted.

Figure 3:
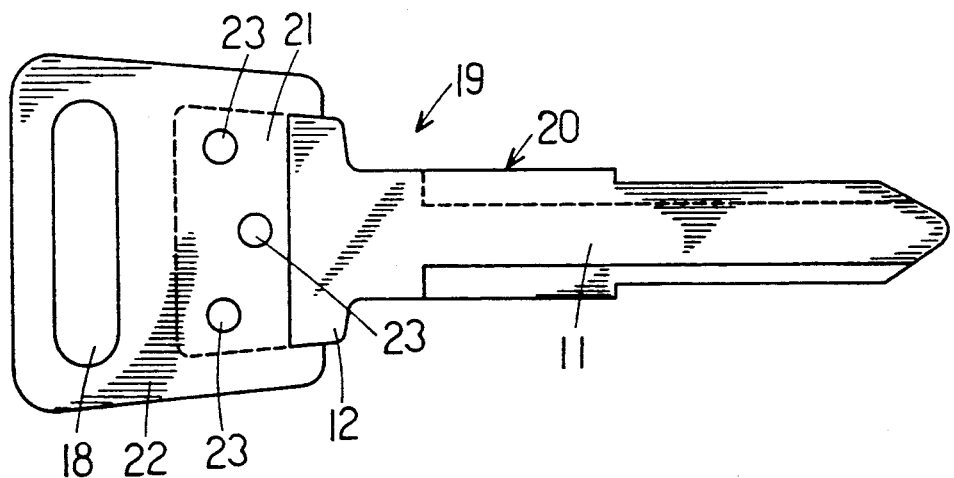
FIG. 3 is a plane view of a key having a gripping portion made of synthetic resin according to the second embodiment of the invention.
Figure 4:
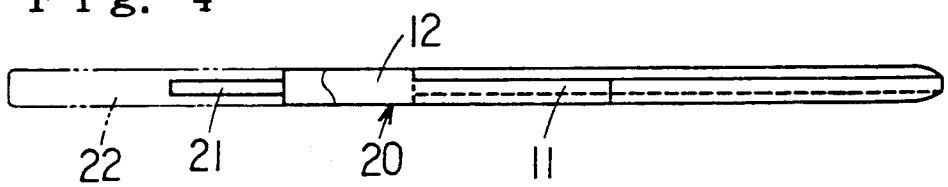
FIG. 4 is a side elevation view of the same key body of the key, as shown in FIG. 3, having the gripping portion made of synthetic resin.

As shown in FIG. 3 and FIG. 4, in a key 19 having a gripping portion made of synthetic resin according to the second embodiment of the invention, the insertion portion 21 of the key body 20 is furnished with a blade portion 11, and a reinforcement portion 12 is made comparatively small, whereas the volume of the synthetic resin portion of the gripping portion 22 is made large. Small holes 23 are formed in the insertion portion 21 having a thickness in the range from 0.4 through 0.9 times the thickness of the blade 11, thereby causing the surface of the insertion portion 21 and rear of the synthetic resin portion to be tightly cemented together.

Therefore, as the key 19 having the gripping portion made of synthetic resin is provided with a reinforcement portion 12, the key 19 has sufficient strength in use. Further, since the area of the insertion portion 21 is small, the insertion portion thereof is only inserted slightly into a metal die during molding, and the moldability thereof is excellent.

Figure 5:
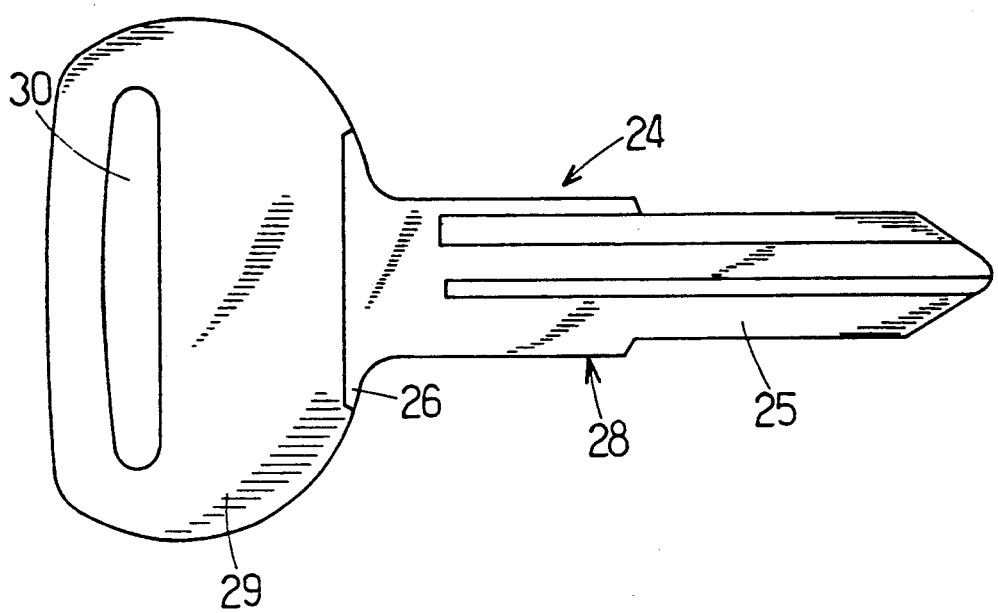
FIG. 5 is a plane view of a key having a gripping portion made of synthetic resin according the third embodiment of the invention.
Figure 6:
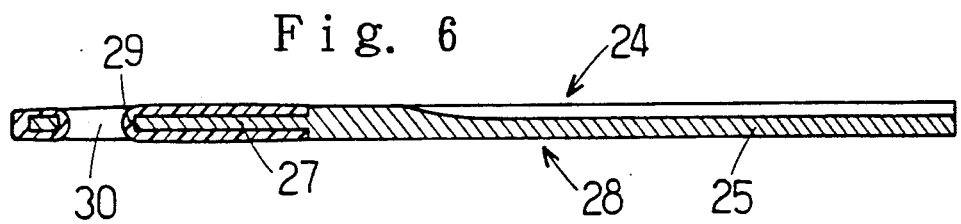
FIG. 6 is a side elevation view of the same key shown in FIG. 5.
Figure 7:
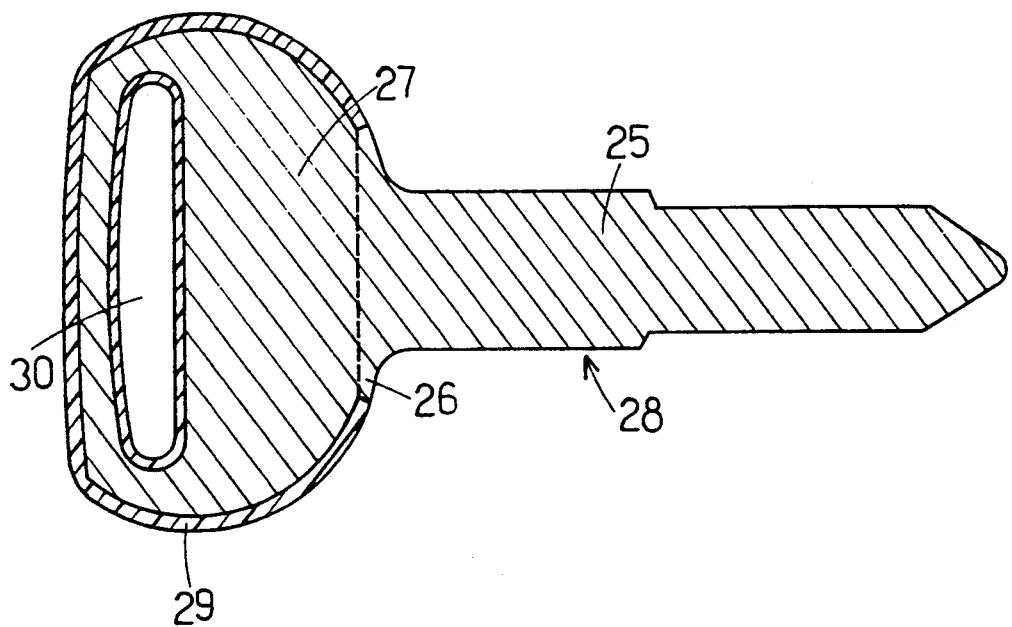
FIG. 7 is a plane sectional view of the same key shown in FIG. 5.

Next, the third embodiment according to the invention is explained with reference to FIG. 5 through FIG. 7. The key 24 having a gripping portion made of synthetic resin according to this embodiment has a metal made key body 28, which consists of a blade portion 25, a reinforcement portion 26 being integrally connected to the corresponding blade portion 25, and having a width which is wider than that of the blade portion 25, and an insertion portion 27 being integrally connected to the corresponding reinforcement portion 26. The key also has a gripping portion 29 made of synthetic resin, which covers the insertion portion 27.

The key 24 having the gripping portion made of synthetic resin is very similar in structure to the key 10 of the first embodiments. However, the maximum thickness of the gripping portion 29 is 1.0 through 1.3 times the thickness of the blade portion 25, and a swelling portion having a bending radius of 300 to 1,000 mm is formed at both the surface and the rear face of the gripping portion 29.

In the event that a conventional thin plane-like key is placed on a desk, etc., it is hard to pick up the key because the key is laid flat against the surface of the desk, etc. However, according to this embodiment since it is easily possible to pick up the key 24 having the gripping portion made of synthetic resin from the plane body of a desk, etc., since one end of the gripping portion 29 is lifted up as the other end thereof is pushed down. In the Figure, reference numeral 30 shows a slot which is one example of a hole for mounting a key ring.

Figure 8:
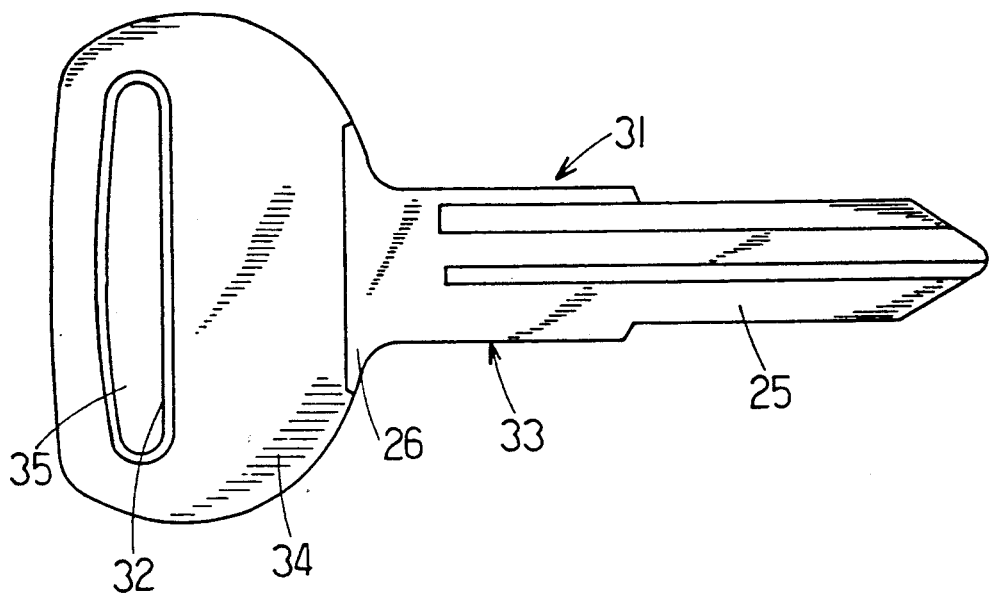
FIG. 8 is a plane view of a key having a gripping portion made of synthetic resin according to the fourth embodiment of the invention.
Figure 9:
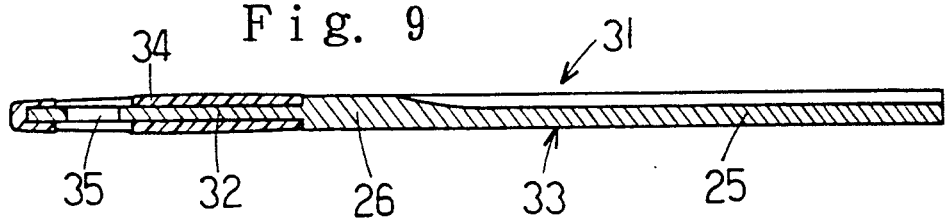
FIG. 9 is a side elevation view of the same key shown in FIG. 8.
Figure 10:
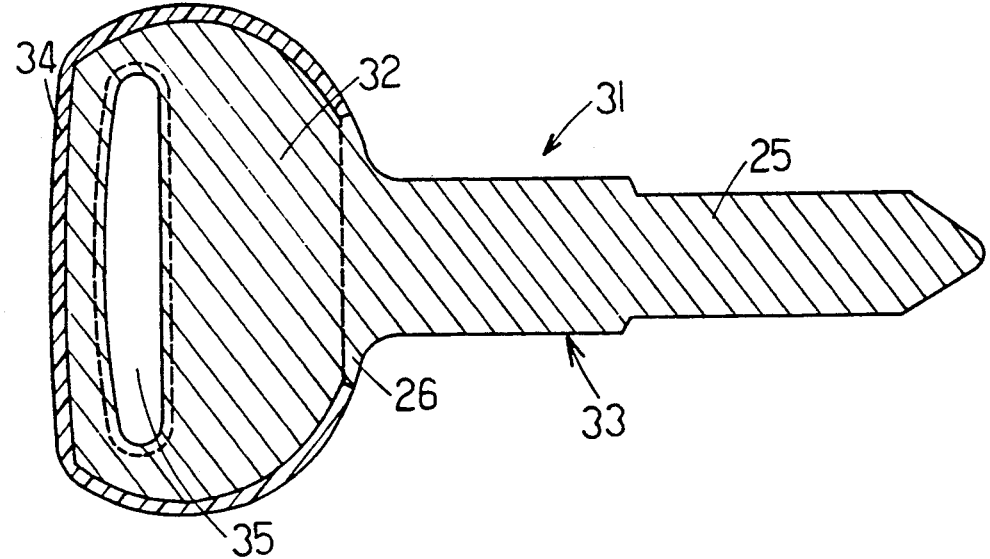
FIG. 10 is a plane sectional view of the same key shown in FIG. 8.

Consecutively, the ensuing description explains the key 31 having the gripping portion made of synthetic resin according to the fourth embodiment of the invention with reference to FIG. 8 through FIG. 10. The key 31 having the gripping portion made of synthetic resin has a metal made key body 33, which consists of a blade portion 25, a reinforcement portion 26 being integrally connected to the corresponding blade portion 25, and having a width which is wider than that of the blade portion 25, and an insertion portion 32 being integrally connected to the corresponding reinforcement portion 26 and also have a gripping portion 34 made of synthetic resin and, which covers the insertion portion 32.

The metal made insertion portion 32 is exposed with respect to the inner circumference of a slot 35 which serves as a hole for mounting a key ring, and which is formed in the gripping portion 34. Thereby, when molding a key 31 having the gripping portion made of synthetic resin, it is possible to insert the insertion portion 32 into a metal die and to grip and fix the insertion portion adjacent the slot 35 within the metal die. Thereby, the thin insertion portion is not bent due to synthetic resin which is poured into the metal die. The gripping portion 34 is therefore molded by placing the corresponding thin insertion portion 32 at the center of the gripping portion 34.

In the case that a metal made key ring is mounted in the corresponding slot 35, there is also the advantage that the inner side of the slot 35 is not damaged by the corresponding key ring.

Figure 11:
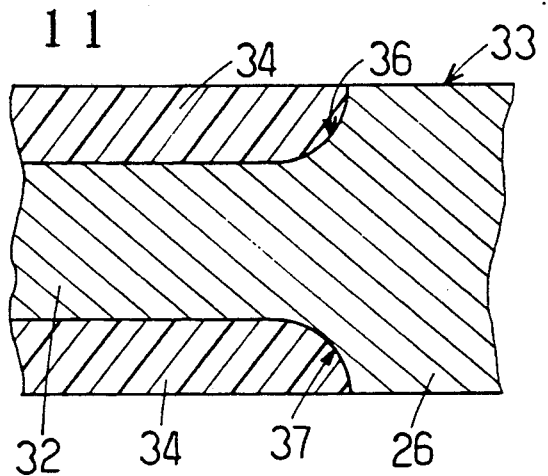
FIG. 11 is an enlarged sectional view showing the junction portion between the reinforcement portion and the insertion portion of a key having a gripping portion made of synthetic resin.
Figure 12:
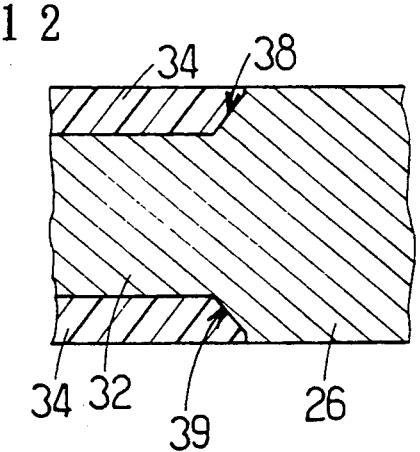
FIG. 12 is an enlarged sectional view showing another embodiment of the junction portion between the reinforcement portion and the insertion portion.
Figure 13:
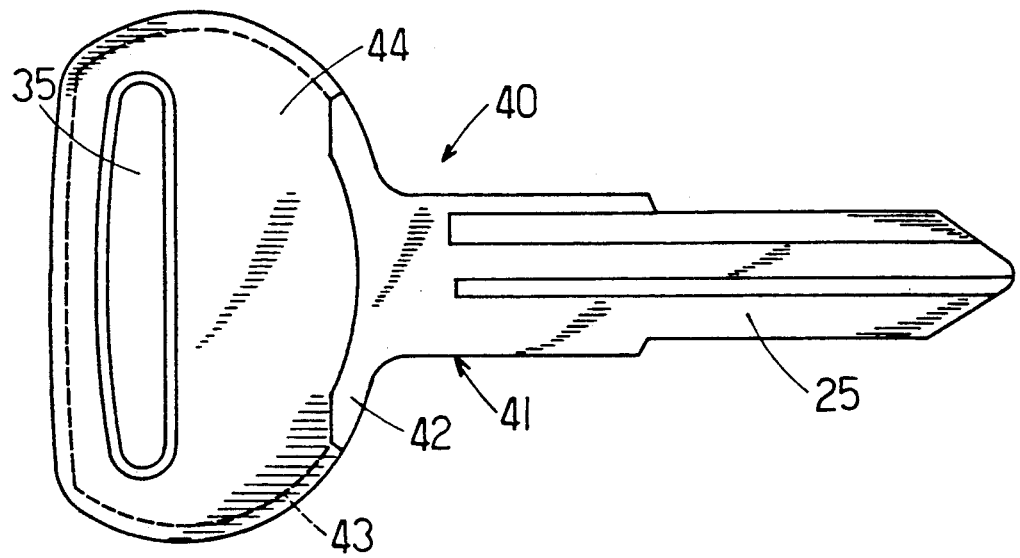
FIG. 13 is a plane view of a key having a gripping portion made of synthetic resin according to the fifth embodiment of the invention.

Further, reinforcement fillets 36 and 37 may be formed at the junction portion between the corresponding insertion portion 32 and the reinforcement portion 26, as shown in FIG. 11, thereby causing the stress concentration, which may occur when bending the gripping portion 34, to be lightened and causing the key body 33 not to be damaged at the junction portion between the insertion portion 32 and the reinforcement portion. Though the surface profile of the reinforcement fillets 36 and 37 in a key 31 having the gripping portion is shown in FIG. 11 as a circular arc, it is possible to form the reinforcement fillets 38 and 39 to have a sectional triangle profile, as shown in FIG. 12.

Next, the differences between the key 40 having the gripping portion made of synthetic resin according to the fifth embodiment of the invention and the key 31 having the gripping portion made of synthetic resin according to the fourth embodiment shall be explained. In a metal made key body 41, the boundary between the reinforcement portion 42 and the insertion portion 43 is not linear but is curved. By composing the metal made key body 41 as shown in the above description, the stress concentration which may be generated at the boundary between the reinforcement portion 42 and the insertion portion 43 can be lightened, thereby extending the service life of the key body 41 against repeated bending.

Also, in the forth and fifth embodiments, the central part of the surface and the rear side of the gripping portions 34 and 44 swelled slightly in the same manner as that of the key 24 having the gripping portion made of synthetic resin, in order to facilitate picking up of the key from a flat surface.

Furthermore, the thickness of the gripping portions 29, 34 and 44 in the keys 24, 31 and 40 having the gripping portion made of synthetic resin is roughly equivalent to the thickness of the blade portion 25, respectively. The invention is applicable, however, wherein the thickness of the corresponding gripping portions is in the range from 0.9 to 1.3 times the thickness of the corresponding blade portion. And in the keys 24, 31 and 40 having the gripping portion made of synthetic resin, the thickness of the insertion portions 27, 32 and 43 is in the range from 0.4 through 0.9 times the thickness of the blade portion 25.

What is claimed is:

1. A key having a gripping portion made of synthetic resin comprising:
    a metal key body comprising a blade portion on which key serrations are formed and an insertion portion integrally connected to said blade portion, wherein the thickness of the insertion portion is thinner than the thickness of the blade portion;

wherein said gripping portion is non-removably fixed to and completely surrounds the insertion portion of said key body and has a thickness in the range of 0.9 to 1.3 times the thickness of the blade portion; and a reinforcement portion having a width substantially wider than the width of said blade portion, and having a thickness roughly equivalent to the thickness of said blade portion, wherein said reinforcement portion is disposed between the insertion portion and the blade portion.

2. A key having a gripping portion made of synthetic resin according to claim 1, wherein the thickness of the insertion portion is in the range from 0.4 to 0.9 times the thickness of the blade portion and the width of the insertion portion is equal to the width of the reinforcement portion.

3. A key having a gripping portion made of synthetic resin according to claim 1 or claim 2, wherein the maximum thickness of the gripping portion is in the range from 1.0 to 1.3 times the thickness of the blade portion and the middle portion of the gripping portion is slightly swelled.

4. A key having a gripping portion made of synthetic resin according to claim 1 or 2, wherein a hole for mounting a key ring is formed in the gripping portion and a metal made insertion portion is exposed along the inner circumference of the hole.

5. A key having a gripping portion made of synthetic resin according to claim 1 or 2, wherein a reinforcement fillet is formed at the junction portion between the reinforcement portion and the insertion portion wherein said insertion portion is integrally connected to the corresponding reinforcement portion and is thinner than the reinforcement portion.

* * * * *